(12) United States Patent
Van Der Aa

(10) Patent No.: US 7,516,465 B2
(45) Date of Patent: Apr. 7, 2009

(54) SLIDER FOR AN OPTICAL DATA WRITING/READING APPARATUS, AND APPARATUS COMPRISING SUCH A SLIDER

(75) Inventor: Michiel Adrianus Henricus Van Der Aa, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 395 days.

(21) Appl. No.: 10/492,664

(22) PCT Filed: Oct. 14, 2002

(86) PCT No.: PCT/IB02/04234

§ 371 (c)(1),
(2), (4) Date: Apr. 15, 2004

(87) PCT Pub. No.: WO03/034416

PCT Pub. Date: Apr. 24, 2003

(65) Prior Publication Data

US 2004/0244023 A1    Dec. 2, 2004

(30) Foreign Application Priority Data

Oct. 18, 2001    (EP) ................................. 01203976

(51) Int. Cl.
G11B 17/00    (2006.01)
(52) U.S. Cl. .................................................. 720/688

(58) Field of Classification Search ............... 369/300; 360/294.1, 294.3, 294.4, 294.6, 234.6, 235.4–235.8, 360/236.6; 720/688, 671, 692, 651, 681, 720/679
See application file for complete search history.

(56) References Cited

U.S. PATENT DOCUMENTS

| 5,497,359 | A | * | 3/1996 | Mamin et al. ............. 369/44.15 |
| 5,970,038 | A | * | 10/1999 | Boutaghou et al. ........ 369/13.13 |
| 5,986,850 | A | | 11/1999 | Wang et al. ................. 360/103 |
| 6,125,008 | A | | 9/2000 | Berg et al. ................... 360/106 |
| 6,137,656 | A | * | 10/2000 | Levi et al. ................. 360/235.4 |
| 6,643,100 | B2 | * | 11/2003 | Iwasaki ................... 360/236.5 |
| 7,092,213 | B1 | * | 8/2006 | Cha ......................... 360/235.4 |
| 2001/0040765 | A1 | * | 11/2001 | Ishihara ................... 360/235.7 |
| 2002/0126418 | A1 | * | 9/2002 | Ueno et al. ............... 360/235.7 |
| 2002/0181153 | A1 | * | 12/2002 | Kang ....................... 360/236.2 |

FOREIGN PATENT DOCUMENTS

EP    1001423    5/2000
EP    1001423 A2    5/2000

* cited by examiner

*Primary Examiner*—Allen T Cao

(57) ABSTRACT

A slider for an optical apparatus having an optical lens defining a focal point, includes a resilient element configured for maintaining a distance between a portion of the slider and a disk; and a sloped end. The optical lens is located over a portion of the sloped end. The slider further includes at least two legs; and an island having a first portion located between the two legs and a second portion located outside the two legs.

22 Claims, 3 Drawing Sheets

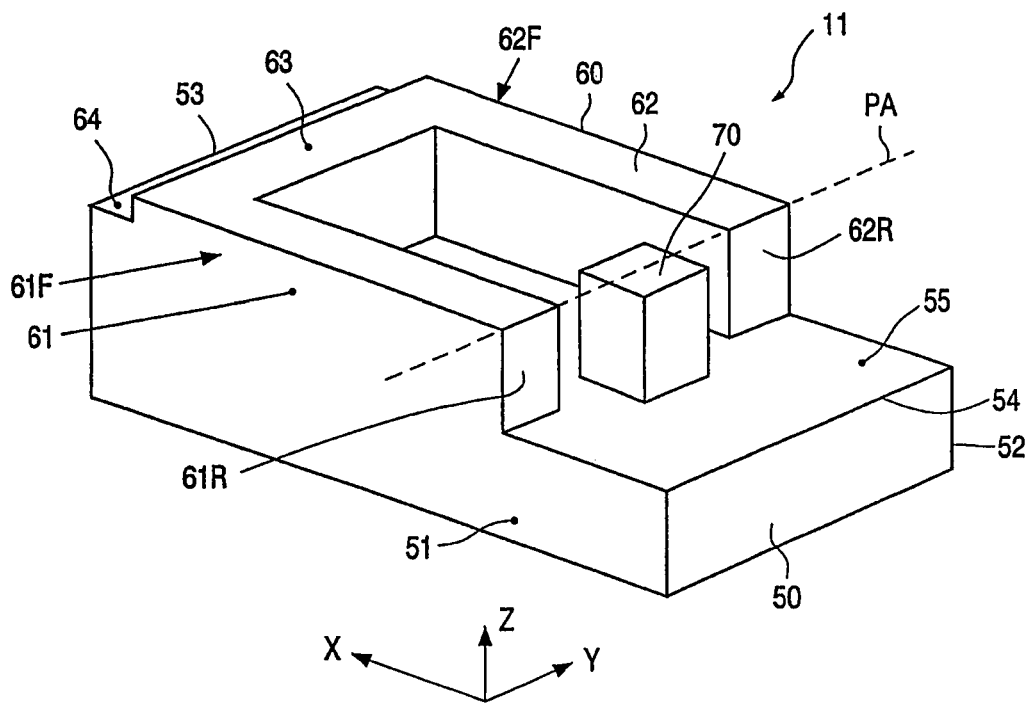
FIG. 4
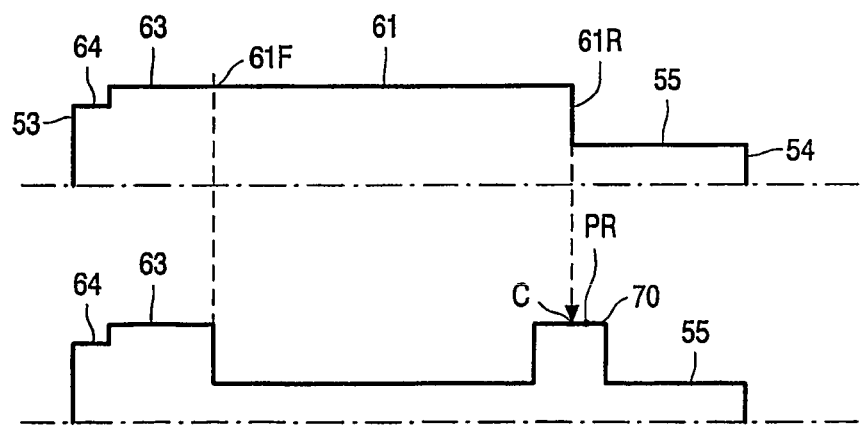
FIG. 5A
FIG. 5B

SLIDER FOR AN OPTICAL DATA WRITING/READING APPARATUS, AND APPARATUS COMPRISING SUCH A SLIDER

The present invention relates in general to the field of writing data into a rotatable storage disk and reading data from such a rotatable storage disk. Such a storage disk may be a magnetic disk, an optical disk, a magneto-optical disk, etc. Particularly, the present invention will be useful in writing/reading apparatuses based on optical means, including a laser beam, for the writing and reading action; therefore, the present invention will hereinafter be specifically explained with respect to such optical systems. However, the scope of the present invention is not restricted to such optical systems, and is equally applicable to a magnetic system.

As is commonly known, an optical storage/retrieval system comprises a rotatable disk and an optical head for scanning the surface of the disk. Through the optical head, a laser beam is focused on the surface of the disk, and the disk is rotated with respect to the optical disk, such that the focused laser beam follows a circular track on the disk surface. In order that the focused laser beam is able to address different tracks, or can follow a spiral track, the optical head is moved in a radial direction with respect to the disk. Data is stored on the disk by varying the beam intensity in a suitable manner, such that physical properties of the disk are modified. Data is read from the disk by sensing the intensity of a reflected beam. Since such data storage/retrieval systems using optical means are commonly known in general, they will not be explained here in more detail.

The optical head comprises an optical lens mounted at an arm, which arm is positioned relatively to the disk by means of a suspension. In this positioning, it is of course very important that the radial position of the optical lens can be controlled with great accuracy in order to position the optical lens precisely above a desired track. However, it is also very important that the height of the optical lens with respect to the surface of the disk be maintained very accurately at a very small value. The present invention relates to a specific type of optical head whose vertical positioning is based on the presence of an air cushion between the optical head and the disk surface. Such an optical head is also referred to as slider. A slider has a slider face directed towards the surface of the disk, which face is also referred to as air bearing surface. The distance between the air bearing slider surface and the disk surface is very small, typically of the order of 1 μm. A holder exerts a bias force on the slider, urging the slider towards the disk surface. However, as the disk rotates, air is sucked into the narrow gap between the air bearing slider surface and the disk surface, developing an air cushion with increased pressure, exerting a force on the slider directed away from the disk surface; this force will also be referred to as lift.

In steady-state circumstances, the lift generated by the air cushion balances the bias force exerted by the holder, so that the distance between the air bearing slider surface and the disk surface remains constant. This distance is also referred to as flying height.

A commonly known problem in this respect is that the flying height tends to depend on the velocity of the disk surface with respect to the air bearing slider surface, because the amount of air sucked into said gap depends on said velocity. Since it is desirable that the flying height should be as constant as possible as was noted above, countermeasures are necessary.

One approach is to drive a storage and retrieval apparatus in such a way that the linear velocity of the disk with respect to the slider is kept constant. This, however, means that the angular velocity or rotation speed of the disk needs to be adapted to the radial position of the slider. Also, it is preferred to operate a disk drive at a constant angular velocity, because in such a mode the access times can be smaller than in a constant linear velocity (operational) mode.

If a disk drive is operated in the constant angular velocity mode, the lift at the outer diameter of the disk will always be greater than the lift at the inner diameter. This results in an increased flying height of the outer diameter as compared with the flying height at the inner diameter.

It has already been proposed to counteract this problem by adjusting the skew angle of the slider with respect to the rotating disk in dependence on the radial position of the slider. EP-A-1,001,423 proposes to adjust the skew angle by moving the slider along a transfer path which does not correspond to a radial path. Skew, however, introduces another problem, namely polarization rotation with respect to the grooves, which is disadvantageous for the tracking method and involves a decrease in the spot quality.

It has also been proposed to counteract said problem by actively adjusting the downward bias force in order to keep a constant flying height. An example of this approach is disclosed in U.S. Pat. No. 6,125,008. This approach, however, involves a rather complicated adjustment mechanism.

Another approach, taken for instance by U.S. Pat. No. 5,986,850, is to design the configuration of the air bearing slider surface in such a way that a force with also a downwardly directed component (i.e. suction) is generated in the space between the air bearing slider surface and the disk surface, which force increases with increasing air speed. This downwardly directed force is exerted on the slider in a location remote from the leading edge, where the upwardly directed cushion force prevails, such that the slider assumes a position with a pitch angle which increases with increasing air speed. Since the optical lens is arranged on a trailing portion of the slider, the flying height of the optical lens is decreased by the increasing pitch angle.

However, the configuration disclosed by said publication is very complicated and difficult to manufacture. Furthermore, as demonstrated by FIG. 5 of said publication, the configuration disclosed by said publication is only capable of reducing the flying height at the outer diameter of the disk but is not capable of maintaining the flying height substantially over the entire disk.

It is a general objective of the present invention to overcome the above-mentioned problems.

It is a specific objective of the present invention to provide a slider with self-adjusting properties in order to maintain its flying height at different disk diameters, while the slider configuration is relatively simple.

These objectives are achieved by the slider comprising resilient suspension means adapted for suspension from an arm of the apparatus, the slider having a substantially horizontal pivot axis which is located substantially in a vertical plane through the focal point of the optical lens.

According to an important aspect of the present invention, the slider has a pitch pivot axis substantially coinciding with the focal point of the optical lens.

The present invention will be explained in more detail in the following discussion of preferred embodiments with reference to the drawings, in which the same reference numerals indicate the same or similar components, and in which:

FIG. 1 schematically illustrates a disk drive;

FIG. 4 is a perspective view of an embodiment of a slider in accordance with the present invention;

FIGS. 5A and 5B are partial longitudinal cross sections of the slider of FIG. 4;

Figure 6:
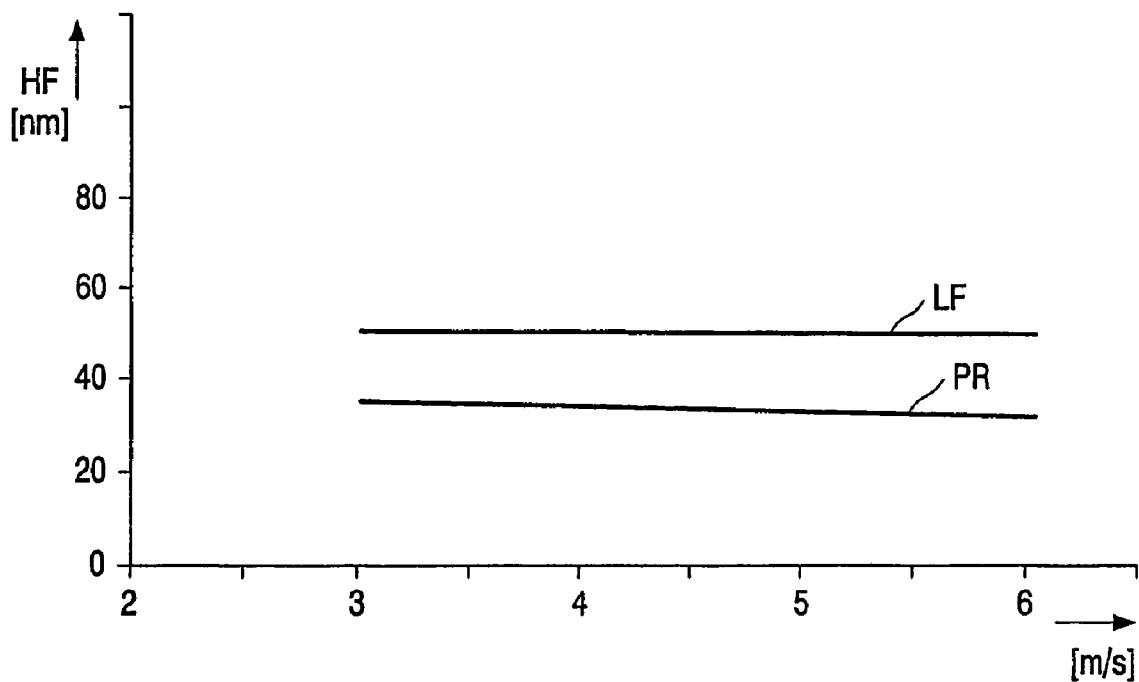

and FIG. 6 shows the results of measurements made with the slider of FIG. 4.

Figure 1:
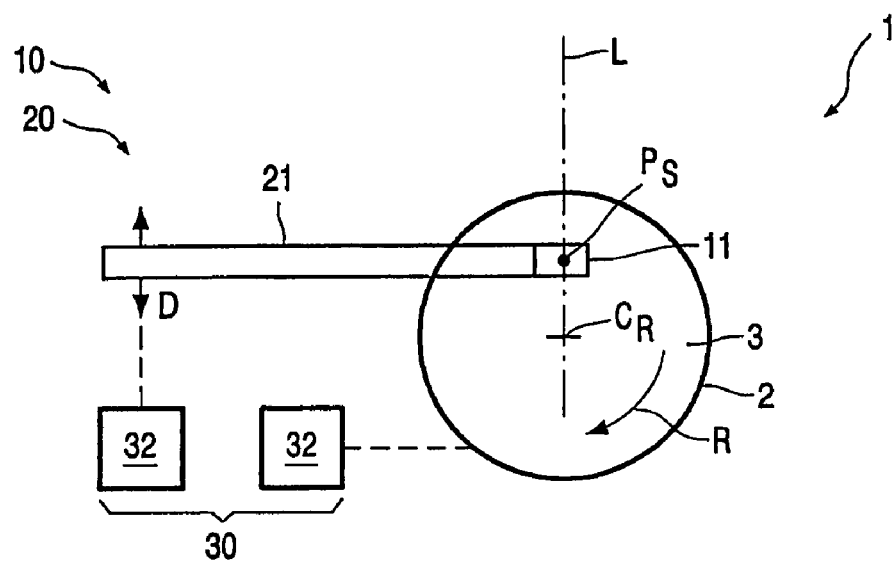

FIG. 1 schematically shows part of a disk drive in plan view, generally indicated with the reference numeral 1. The disk drive apparatus 1 will comprise a housing, which is not shown for the sake of simplicity, and means for receiving a rotatable disk 2, which by way of an example is an optical disk. The disk drive apparatus 1 further comprises scan means 10 for scanning the surface of the disk 2 in order to write data onto the disk 2 or to read data from the disk 2. Such scan means 10 comprise a scan head 11, positioning means 20 for positioning the scan head 11 with respect to the disk, and moving means 30 for moving the scan head 11 with respect to the disk surface along circular tracks. The moving means 30 comprise disk rotating means 31 for rotating the disk 2, as indicated by the arrows R. Since means for receiving and rotating a disk in a disk drive apparatus are commonly known, this will not be explained in more detail.

The positioning means 20 comprise an arm 21 which holds the scan head 11 above the surface 3 of the disk 2, as will be explained later in more detail. The disk has a center of rotation $C_R$ defined by the rotating means 31. The scan head 11 defines a scan position $P_S$ on the surface 3 of the disk 2. A radial line connecting the center of rotation $C_R$ with the scan position $P_S$ is referenced at L. The arm 21 has a central axis which preferably is directed perpendicular to said radial line L. The moving means 30 comprise arm displacing means 32 for displacing the arm 21 with the scan head 11 in a direction parallel to said radial line L, as indicated by arrows D. Since means for displacing a scan head 11 are commonly known, the arm displacement means 32 will not be described in more detail here.

Figure 2A:
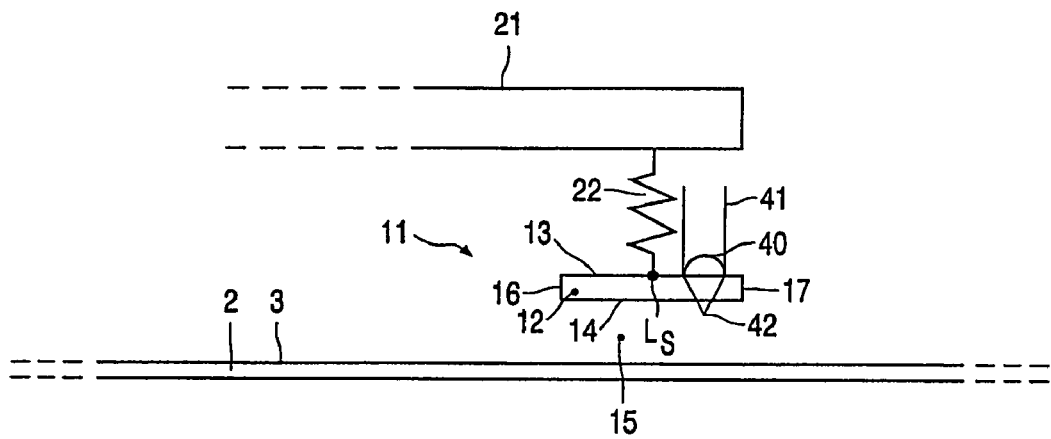
FIGS. 2A and 2B are diagrammatic side elevations of an arm carrying a slider.
Figure 2B:
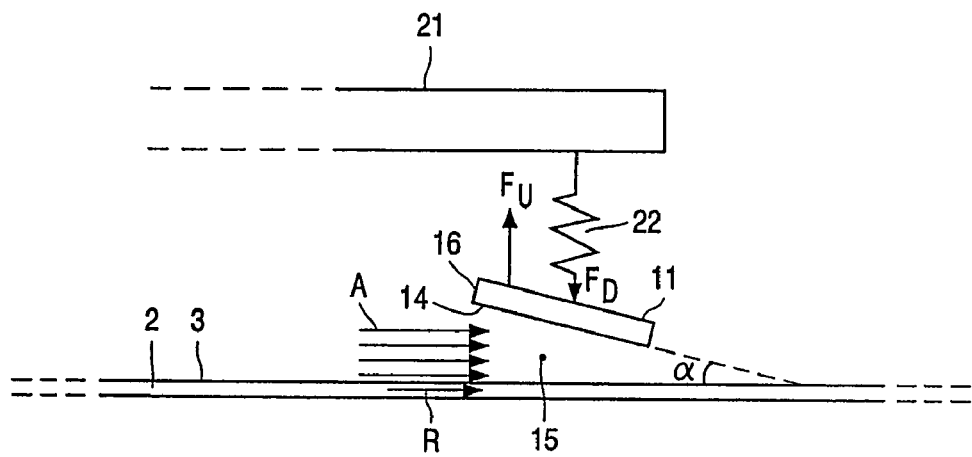

FIGS. 2A and 2B schematically show the free end of the arm 21 carrying the scan head 11 in side elevation. The scan head 11 comprises a scan head body 12 with a top surface 13 and a bottom surface 14, and is suspended from the free end of the arm 21 by resilient suspension means 22 capable of resiliently exerting a downwardly directed force on the scan head body 12. The suspension means 22 engages the scan head body 12 at a central location thereof, indicated as suspension location $L_S$. The scan head body 12 is balanced with respect to the suspension means 22, such that, in a steady-state equilibrium, when the scan head 11 is positioned with its bottom surface 14 close to the surface 3 of the disk 2, the bottom surface 14 of the scan head 11 is substantially parallel to the disk surface 3, as shown in FIG. 2A.

During operation, the disk rotates under the scan head 11 in a direction from left to right in the drawing, as illustrated by arrow R in FIG. 2B. Due to this rotation, air is sucked into the small gap 15 between the bottom surface 14 of the scan head 11 and the top surface 3 of the disk 2, as indicated by arrows A in FIG. 2B. The edge of the scan head 11 where the air flow A enters said gap 15 will be denoted the leading edge 16, whereas the opposite edge of the slider 11, where the air flow leaves said gap 15, will be denoted the trailing edge 17.

This air flow causes a kind of air cushion under the bottom surface 14 of the scan head 11, with a rather complicated pressure distribution. Some parts of the bottom surface 14 of the scan head 11 feel an increased air pressure, while other parts feel a reduced pressure. Overall, the bottom surface 14 of the scan head 11 feels a force directed away from the disk 2. This upwardly directed air cushion force primarily obtains between the leading edge 16 and the suspension means 22, as indicated by arrow $F_U$ in FIG. 2B. This air cushion force $F_U$ tends to push the scan head 11 away from the moving disk 2. The scan head 11, also indicated hereinafter as slider, thus floats on the air cushion in the gap 15.

The slider 11 is kept in place by a downwardly directed force $F_D$ exerted by the resilient suspension means 22. The two forces $F_U$ and $F_D$, exerted on different locations of the slider 11, tend to tilt the slider 11 such that the leading edge 16 is lifted and the trailing edge 17 is lowered, as is clearly illustrated in FIG. 2B in an exaggerated manner. The centerline of the slider 11 now encloses an angle α with the surface 3 of the disk 2, indicated as pitch angle.

The slider 11 carries a lens 40 which forms part of an optical system of the disk drive apparatus 1. The lens 40 receives a laser beam 41 which is directed substantially perpendicular to the surface 3 of the disk 2, and focuses the laser beam 41 on a focal spot 42. This focal spot 42 determines the scan position $P_S$ as indicated in FIG. 1. Depending on the circumstances, the focal spot 42 may be at some distance below the bottom surface 14 of the slider 11, or rather close to the bottom surface 14 of the slider 11, such as in near-field technology. For accurate and high-density operation, it is desirable that the distance between the focal spot 42 and the disk surface 3 remains constant.

However, when the rotational speed or angular velocity of the disk 2 is kept constant, the linear velocity of the disk 2 with respect to the slider 11 varies with varying distance between scan spot $P_S$ and rotational center $C_R$. More particularly, when the slider 11 is close to the outer edge of the disk 2, the linear velocity of the disk 2 is greater, and hence the amount of air A sucked into the gap 15 is larger, as compared with the slider 11 being close to the center of rotation $C_R$. With an increasing air flow A, the lift force $F_U$ increases, causing the distance between focal spot 42 and disk surface 3 to increase, which is undesirable.

Figure 3:
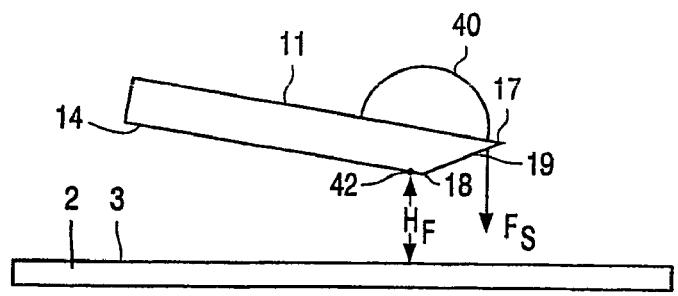
FIG. 3 is a diagrammatic side elevation of a slider on a larger scale.

According to the present invention, this undesirable effect can be reduced or even eliminated by suitably designing the geometry of the lower surface 14 of the slider 11, also indicated as air bearing surface. FIG. 3 shows, on an exaggerated scale, a slider 11 designed according to the present invention in side elevation. FIG. 3 clearly shows that the slider 11 has a lower surface 14 terminating close to the focal spot 42 at a certain distance from the trailing edge 17 of the slider 11. A back surface 19 meets the lower surface 14 at an angle greater than the pitch angle α, such that the meeting point 18 between back surface 19 and lower surface 14 is always the lowermost point of the slider 11. In the preferred embodiment, said angle is substantially equal to 90°, leading to a trailing balcony not shown in FIG. 3. In FIG. 3, said angle is approximately 45°, and the back surface 19 tapers towards the trailing edge.

The clearance between the focal spot 42 and the disk surface 3 will be denoted the flying height $H_F$.

Air flow A, which is compressed under the tilted slider 11, expands after passing the lowermost slider point 18, causing the air pressure beyond the lowermost slider point 18 (in FIG. 3: to the right of the lowermost slider point 18) to drop. As a result, the trailing portion of the slider 11 receives from the air A a reduced lift or even a downwardly directed suction force, indicated by arrow $F_S$, which tends to increase the pitch angle α. Thus, with an increased air flow, the pitch angle α will increase due to the combined effect of lift force $F_U$ acting on a leading portion of the slider and suction force $F_S$ acting on a trailing portion of the slider.

According to an important aspect of the invention, the bottom geometry of the slider 11 is designed such that tilting of the slider (i.e. increasing of pitch angle α) takes place as a pivotal movement with respect to a horizontal pivot axis PA which is located in a vertical plane through the focal spot 42. Thus, small variations in pitch angle α will, in a first approximation, not involve any vertical variations of the location of the focal spot 42.

Preferably, the focal spot coincides with said pivot axis.

An example of a slider geometry will be discussed in more detail below with reference to FIGS. 4 and 5A-5B, in which the dimensions are not shown to scale, the Z-dimensions being particularly exaggerated for the sake of clarity. This example has been tested in an experiment; the results of this experiment are shown in FIG. 6.

FIG. 4 is a three-dimensional view of the bottom of a slider 11, placed upside down. A longitudinal direction will be denoted the X-direction, and a transverse direction will be denoted the Y-direction (X and Y being parallel to a disk surface in normal conditions). The slider 11 has a substantially rectangular slider body 50 and a substantially U-shaped raised portion 60. This raised portion 60 comprises two legs 61, 62 which are arranged alongside the side edges 51, 52 of the slider body 50, each leg 61, 62 having a front end 61F, 62F and a rear end 61R, 62R. The raised portion 60 further has a bridge 63 connecting the front ends 61F, 62F of said legs 61, 62, the bridge 63 being arranged alongside the front edge 53 of the slider body 50. The bridge 63 and the legs 61, 62 each have a substantially rectangular cross-section in this example.

In this example, the slider 11 has a width (Y-dimension) of 2.5 mm, and the bridge 63 entirely spans this width. The bridge 63 has a width (X-dimension) of 0.8 mm.

Furthermore, in this example, the slider 11 has a length (X-dimension) of 3.5 mm, but the legs 61, 62 are shorter. Each leg has a width (Y-dimension) of 0.48 mm, and a length (X-dimension) of 1.95 mm; thus, the rear end 61R, 62R of each leg 61, 62 is located at a distance of 0.75 mm from the trailing edge 54 of the slider.

The height (Z-dimension) of the legs 61, 62 and the bridge 63 is approximately 7.1 μm.

Furthermore, in this example, the slider 11 has a height (Z-dimension) of 250 μm.

Preferably, as shown in FIG. 4, the bridge has at its front a stepped recess 64 over the entire length of the bridge 63. This stepped recess 64 has a depth (Z-dimension) of 1.0 μm and a width (X-dimension) of 0.15 mm.

FIG. 5A is a longitudinal sectional view of the slider, taken on a leg 61, and FIG. 5B is a similar sectional view taken on the centerline of the slider.

The remaining bottom face of the slider, i.e. the bottom with the exception of the bridge 63 and legs 61, 62, will be referred to as recessed bottom surface 55. The exemplary slider has been manufactured starting from a solid block through etching away of portions thereof (using a wet etching technique) down to the desired depth, leaving the recessed bottom surface 55. Although the choice of material is not essential, in this example the material was glass. In practice, other transparent materials will do. Alternatively, if one wishes to use non-transparent material, a transparent window for the optical components should be included.

The slider further comprises a centrally located island portion 70, having a square configuration (in X- and Y-directions). The island portion 70 stands raised from the recessed bottom surface 55 and has a height equal to the height of the bridge 63 and legs 61, 62, such that the bottom surface of the island portion 70 lies in the same XY-plane as the bottom surface of the bridge 63 and the bottom surfaces of the legs 61, 62. The island portion 70 has a length (X-dimension) of 0.5 mm and a width (Y-dimension) of 0.5 mm. The center C of the island portion 70 is located on a line connecting the rear ends 61R, 62R of the legs 61, 62, at equal distances from said legs.

A lens (not shown in FIG. 4) was mounted on the slider, having its optical axis coinciding with the center C of the island portion 70 and having a focal point 42 (see FIG. 2A) coinciding with the face of the island portion. Thus, said focal point coincides with said center C. Furthermore, these Figures show a reference point PR, lying 0.22 mm behind the center C of the island portion 70.

The slider 11 was suspended (U-shaped portion 60 down) from a suspension point located halfway between the leading edge 53 and the trailing edge 54. The suspension means used was a "nanosuspension 850 LSF", available as a standard component from the Hutchinson Technology Company of Hutchinson, Minn. USA. This suspension has the following properties, specified in the range from 0.03 to 0.05 N:

pitch stiffness=2 μNm/degree
roll stiffness=2.5 μNm/degree
lateral stiffness=12.5 N/mm The suspension was set to exert a downward force of 0.03 N.

The suspended slider was placed above a disk, and the disk was rotated with varying speed. The flying height of the slider was measured at different positions. FIG. 6 shows the results of the measurements.

In FIG. 6, the horizontal axis shows the linear speed of the disk surface 3 with respect to the slider 11. The vertical axis shows the flying height HF measured at the focal point C (indicated with line LF) and measured at said reference point PR (indicated with line LR). It is clearly visible that the flying height measured at the focal point is substantially constant (variation less than 2.5%) over the entire range of disk speeds from 3 m/s to 6 m/s, corresponding to the normal speeds of a disk at its inner diameter and its outer diameter. Also, it can be seen that the flying height measured at the reference point PR decreases with increasing speed, thus indicating that the pivot axis PA is located at the focal point C.

Although the present invention has been described in detail with respect to a specific preferred embodiment, it should be clear that the invention is not restricted to this embodiment. Rather, variations and modifications are possible within the protective scope as defined in the appended claims.

The invention claimed is:

1. A slider for an optical data writing/reading apparatus, the slider carrying an optical lens defining a focal point; the slider comprising:

resilient suspension means adapted for suspension from an arm of said apparatus, the slider having a substantially horizontal pivot axis which is located substantially in a vertical plane through said focal point, wherein the slider has a sloped end, the optical lens being located over a portion of the sloped end;

a slider body;

a substantially U-shaped raised portion standing raised from a recessed bottom surface, the raised portion comprising two legs arranged alongside side edges of the slider body, each leg having a front end and a rear end, each leg having a same height from the front end to the rear end, the raised portion further comprising a bridge connecting the front ends of said legs, the bridge having the same height as the two legs and being arranged alongside substantially an entire front edge of the slider body, wherein the bridge has a uniform width; and an island portion standing raised from the recessed bottom surface, the island portion having a center located on a line connecting the rear ends of the legs, at equal distances from said legs; the island portion being symmetric about the center.

2. The slider as claimed in claim 1, wherein said pivot axis substantially coincides with said focal point.

3. The slider as claimed in claim 1, wherein said focal point substantially coincides with said center of the island portion.

4. The slider as claimed in claim 3, wherein the island portion has a height substantially equal to a height of the bridge and legs, such that a bottom surface of the island portion substantially lies in a same plane as a bottom surface of the bridge and bottom surfaces of the legs.

5. The slider as claimed in claim 4, wherein said center of the island portion substantially coincides with said bottom surface of the island portion.

6. The slider as claimed in claim 3, wherein the bridge has a stepped recess at its front.

7. The slider as claimed in claim 6, wherein said stepped recess extends over substantially an entire length of the bridge.

8. The slider as claimed in claim 3, wherein the bridge and the legs each have a substantially rectangular cross-section.

9. The slider as claimed in claim 3, wherein the island portion has a substantially square configuration/shape.

10. An optical data writing/reading apparatus comprising scan means for scanning the surface of a disk, said scan means comprising the slider as claimed in claim 1.

11. The optical data writing/reading apparatus as claimed in claim 10, said scan means further comprising:
    disk rotating means for rotating a disk, the disk rotating means defining a center of rotation;
    positioning means for positioning the slider with respect to the disk, the positioning means comprising an arm from which the slider is suspended; and
    arm displacing means for displacing the arm with the scan head in a direction parallel to a radial line connecting the center of rotation with the focal point.

12. A slider for an optical apparatus having an optical lens defining a focal point, the slider comprising:
    a resilient element configured for maintaining a distance between a portion of the slider and a disk;
    a sloped end;
    at least two legs having a same height from beginnings to ends of the at least two legs;
    a bridge connecting the at least two legs and having the same height as the at least two legs, the bridge being arranged alongside substantially an entire front edge of the slider body and having a uniform width; and
    an island having a center aligned with the ends of the at least two legs; the island being symmetric about the center.

13. The slider of claim 12, wherein the slider has a substantially horizontal pivot axis which is located substantially in a vertical plane through the focal point.

14. The slider of claim 13, wherein the pivot axis substantially coincides with the focal point.

15. The slider of claim 12, wherein the island is aligned with the optical lens, the island having a first portion located between legs of the slider and a second portion located outside the legs.

16. An optical data writing/reading apparatus comprising the slider of claim 12.

17. A slider for an optical apparatus having an optical lens defining a focal point, the slider comprising:
    at least two legs having a same height from beginnings to ends of the at least two legs;
    a bridge connecting the at least two legs and having the same height as the at least two legs, the bridge being arranged alongside substantially an entire front edge of the slider body and having a uniform width; and
    an island having a center aligned with the ends of the at least two legs, the island being symmetric about the center.

18. The slider of claim 17, wherein the island is aligned with the optical lens.

19. The slider of claim 17, further comprising:
    a resilient element configured for maintaining a distance between a portion of the slider and a disk; and
    a sloped end;
    wherein the optical lens is located over a portion of the sloped end.

20. The slider of claim 17, wherein the slider has a substantially horizontal pivot axis which is located substantially in a vertical plane through the focal point.

21. The slider of claim 20, wherein the pivot axis substantially coincides with the focal point.

22. An optical data writing/reading apparatus comprising the slider of claim 17.

* * * * *